(12) United States Patent
Park

(10) Patent No.: US 6,377,245 B1
(45) Date of Patent: Apr. 23, 2002

(54) ULTIMATE ERGONOMIC MOUSE

(76) Inventor: Chin K. Park, 216 Stratford Dr., San Francisco, CA (US) 94132

( * ) Notice: Subject to any disclaimer, the term of this patent is extended or adjusted under 35 U.S.C. 154(b) by 0 days.

(21) Appl. No.: 09/388,618

(22) Filed: Sep. 2, 1999

(51) Int. Cl.$^7$ ................................................. G09G 5/08
(52) U.S. Cl. ..................... 345/163; 345/164; 345/179; D14/402; D14/405
(58) Field of Search ................................ 345/163, 179, 345/164; D14/402, 405, 409

(56) References Cited

U.S. PATENT DOCUMENTS

| | | | | |
|---|---|---|---|---|
| D281,164 S | 10/1985 | Kim | ........................ | D14/114 |
| 4,780,707 A | * 10/1988 | Selker | ........................ | 345/163 |
| 4,862,165 A | 8/1989 | Gart | ........................ | 341/20 |
| 5,165,630 A | 11/1992 | Connor | ........................ | 248/118.1 |
| 5,175,534 A | 12/1992 | Thatcher | ........................ | 340/706 |
| 5,296,871 A | 3/1994 | Paley | ........................ | 345/163 |
| 5,340,067 A | * 8/1994 | Martin et al. | ........................ | 248/118.5 |
| D350,737 S | 9/1994 | Chen | ........................ | D14/114 |
| D359,037 S | 6/1995 | Siano | ........................ | D14/114 |
| 5,434,594 A | * 7/1995 | Martinelli et al. | ........................ | 345/163 |
| 5,576,733 A | 11/1996 | Lo | ........................ | 345/163 |
| 5,648,798 A | * 7/1997 | Hamling | ........................ | 345/163 |
| 5,731,807 A | * 3/1998 | Feierbach | ........................ | 345/163 |
| 5,833,180 A | 11/1998 | Baranowski | ........................ | 248/118 |
| 5,880,715 A | 3/1999 | Garrett | ........................ | 345/163 |
| 5,894,303 A | 4/1999 | Barr | ........................ | 345/163 |

* cited by examiner

Primary Examiner—Steven Saras
Assistant Examiner—William C. Spencer

(57) ABSTRACT

The ultra ergonomic computer mouse includes an angled grip-rod which, when held and placed in the correct manner, supports and influences all the fingers and the hand to be in a naturally curved position. It also includes a contoured and grooved rubber foundation, which is shaped in such a way that the hand holding this mouse is put in a natural position and is greatly supported In this way, the user of this mouse would not be required to twist or in some way contort the hand, wrist, or forearm Therefore, the ultra ergonomic mouse especially prevents and/or reduces fatigue, discomfort, and pain despite continuous use over long periods of time.

6 Claims, 9 Drawing Sheets

ULTIMATE ERGONOMIC MOUSE

CROSS-REFERENCE TO RELATED APPLICATION

U.S. Pat. No. Des. 396,034 (7/1998) Whitening—Computer Mouse—D14/114

U.S. Pat. No. Des. 389,820 (1/1998) Matella—Computer Mouse—D14/114

U.S. Pat. No. Des. 367,272 (2/1996) Hood etc.—Three Dimensional Mouse—D14/114

U.S. Pat. No. Des. 359,037 (6/1995) Siano—Computer Mouse—D14/114

U.S. Pat. No. Des. 350,737 (9/1994) Chen—Mouse—D14/114

U.S. Pat. No. Des. 281,164 (10/1985) Kim—Mouse—D14/114

U.S. Pat. No. 5,894,303 (4/1999) Barr—Computer mouse and shell therefore—345/163

U.S. Pat. No. 5,880,715 (3/1999) Garrett—Pyramidally Shaped computer mouse—345/163

U.S. Pat. No. 5,833,180 (11/1998)Baranowski—Computer mouse operation pad and forearm—248/118

U.S. Pat. No. 5,576,733 (11/1996) Lo—Ergonomic computer mouse—345/163

U.S. Pat. No. 5,296,871 (3/1994) Paley—Three dimensional mouse with Tactile feedback—345/163

U.S. Pat. No. 5,175,534 (12/1992)Thatcher—Computer input device using the movements of a user's fingers —34/706

U.S. Pat. No. 5,165,630 (11/1992) Connor—Wrist protector—248/118.1

U.S. Pat. No. 4,862,165 (8/1989) Gart—Ergonomically shaped hand controller—341/20.

BACKGROUND

1. Field of Invention

This invention relates to a computer input device commonly known as a computer mouse. Specifically, this invention seeks to improve the mechanics behind how the mouse is employed by a hand in order to input data to the computer. The invention is an ergonomic mouse that consists of a pre-designed hand base, which allows for the users' hand to be more comfortable. In this way, the invention will improve the position in which a mouse is held or moved.

BACKGROUND

2. Description of Prior Art

The basic conventional mouse poses several problems for its users. Firstly, the mouse requires that the user place his/her hand on top of the mouse in order to function it. This causes several pain and fatigue issues, specifically for the user's hand and wrist. This is due in part because of the awkward, unnatural position in which the hand is put. For instance, Compaq's users guide p.74–75 give warning against wrong use or handling of the mouse. Medical issues concerning strain and imposed stress on the hands and wrist are increasing more and more today. With an increase of these concerns, thereafter, inventors created several types of mice to combat these problems.

1. U.S. Pat. No. 5,165,630 (1992) to Conner. The pad was invented to temporarily support t the wrist when using the mouse. However, this pad does not offer a solution for the fatigued hand, wrist, and arm. The mouse's fictions are still utilized with the employment of the buttons on top of the mouse, causing still, fatigue to the arm and hand due to the incorrect ergonomic design.

2. U.S. Pat. No. 5,880,715 (1999) to Garrett. This mouse is basically the conventional mouse in a slightly different shape. The pyramid shape of this mouse does nothing to relieve he pain from overuse. The functional buttons on this mouse are not in a convenient location for the user as the fingers must be hyper-extended in order to function it correctly.

3. U.S. Pat. No. 4,862,165 (1989) Gart. This model has a good design but it still forces the hand to cover the mouse in an unnatural hand position.

4. U.S. Pat. No. 5,576,733 (1999). This is also a good design and is meant to alleviate any ergonomic concerns. However, the button function on the mouse is in a position that requires the user to tilt the hand in order to click the button. The position in which the hand using this mouse is tilted, while using the mouse, will produce strain and discomfort for the user over the long run.

SUMMARY

The present invention, the ultra ergonomic mouse, is a computer mouse comprised of an angled grip-rod on the mouse and a grooved and contoured rubber foundation that provides comfort for the hand, wrist, and also the forearm.

OBJECTS AND ADVANTAGES

The mouse described in the present invention present several advantages with its use:

a) To provide a mouse whose user's hand and wrist are accommodated by a naturally curving and relaxed position.

b) To provide a mouse whose user's fingers can easily handle and surely click the function buttons.

c) To provide a mouse which will not be slippery even in a child's small hands, but will ensure a good grip on the mouse.

d) To provide a mouse which has grooves for fingers and the palm within the foundation to provide maximum support for the hand and wrist, protecting from twisting and angling of the arm.

e) To provide a mouse which promises a comfortable hand base with less chance of fatigue, discomfort, and pain, even after long periods of continuous use.

A further object of the invention, which serves as an advantage, is the mouse's grip-rod, which allows the hand to grip or hold the mouse as if in a writing position. From this description, a number of advantages of the invention become evident. Internet users, graphic designers, and other frequent computer users will especially benefit from this ergonomic mouse, as it was specifically designed with these users in mind.

DRAWING FIGURES

REFERENCE NUMERALS IN DRAWINGS

| | |
|---|---|
| 10 grip-rod | 12 main click button |
| 14 2$^{nd}$ click button | 16 scroll click button |
| 18 plastic body | 20 middle finger groove |
| 22 ring finger groove | 24 pinkie finger groove |
| 26 rise | 28 hole for power cord/optical device |

DESCRIPTION

Figure 1:
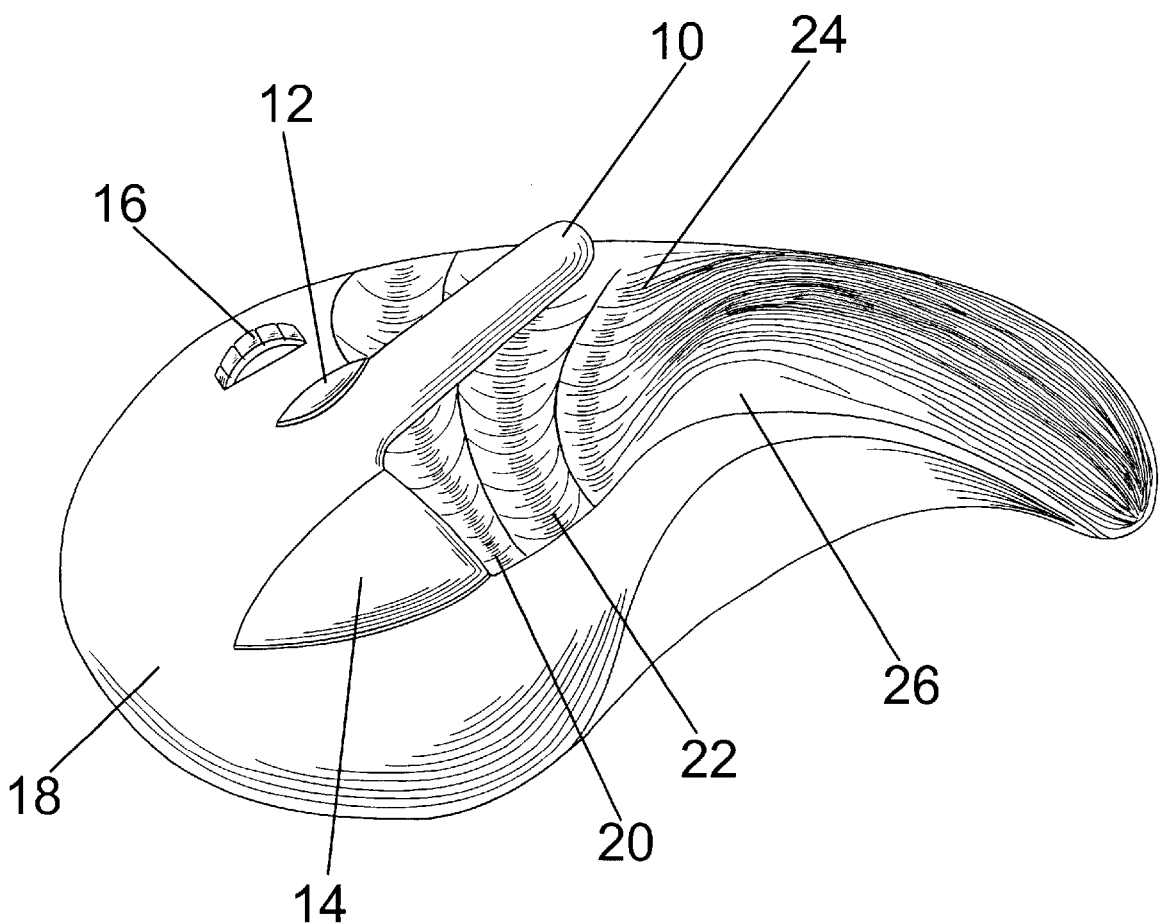
FIG. 1 is a perspective view.
Figure 1A:
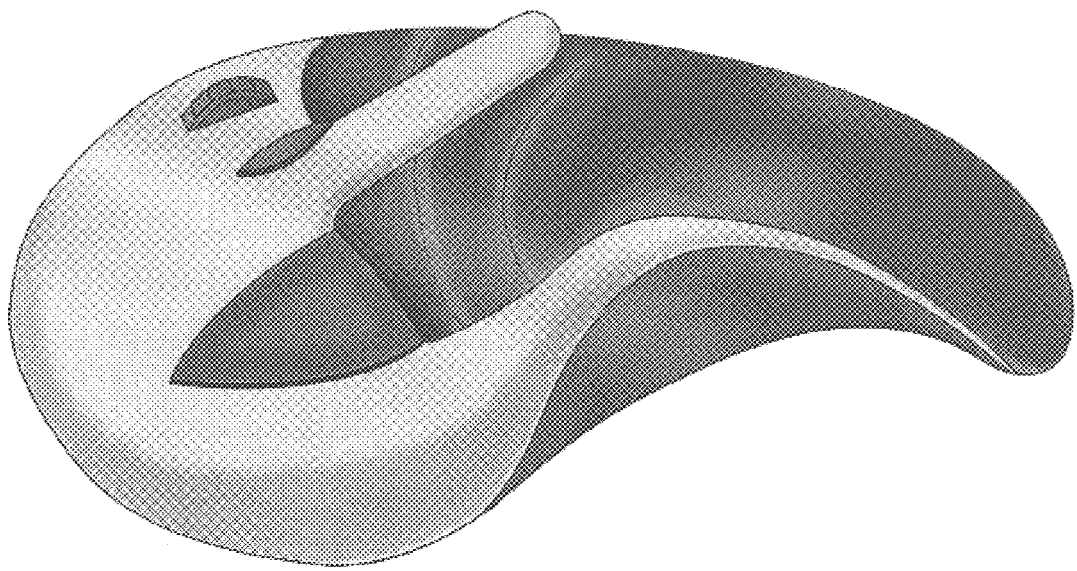
FIG. 1A is a perspective view with bit map screen image
Figure 1B:
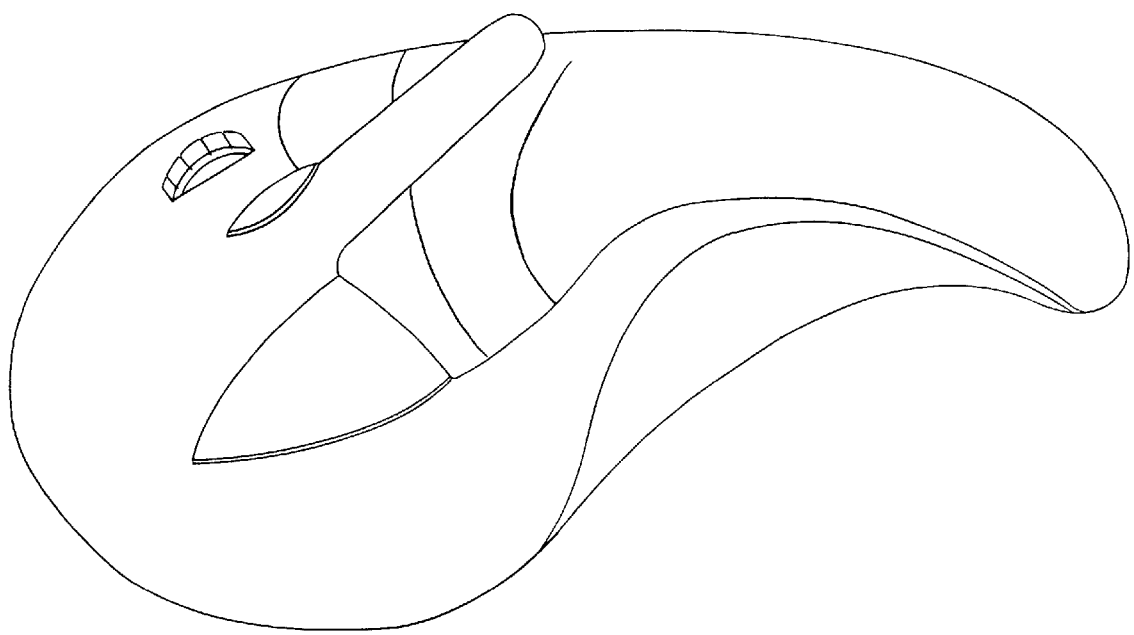
FIG. 1B is a perspective view without shadow.
Figure 2:
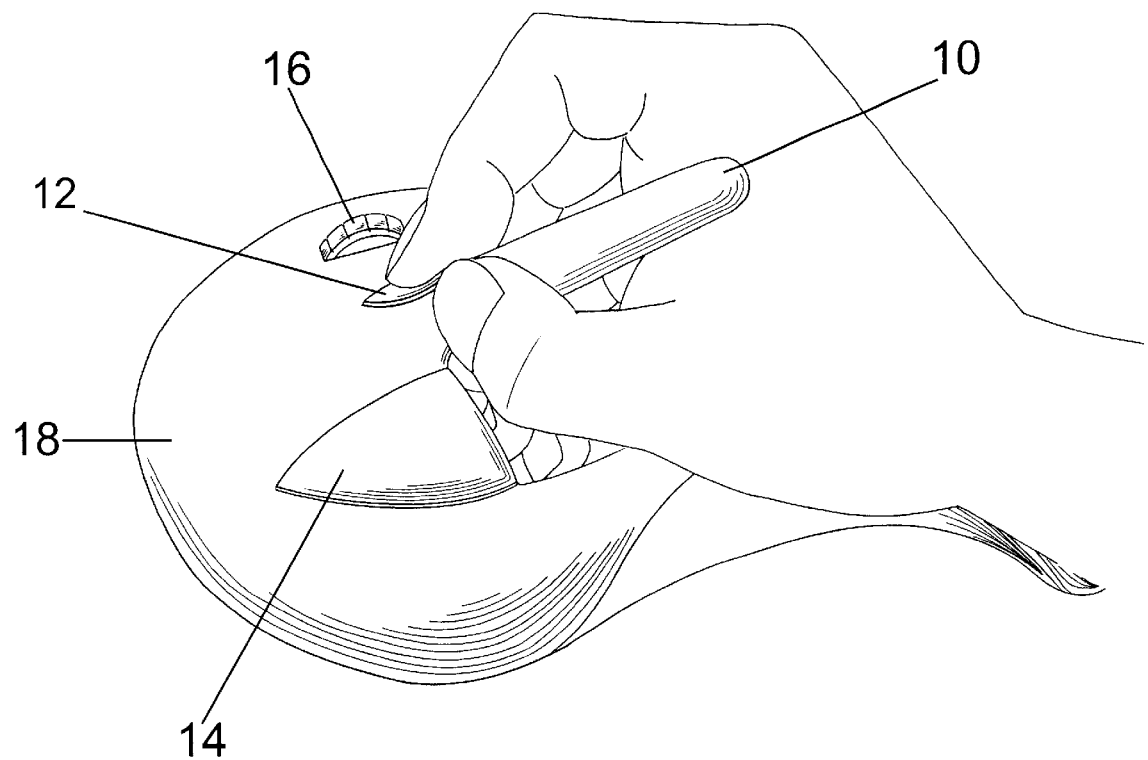
FIG. 2 is a perspective view with hand.

FIGS. 1–2 Preferred Embodiment

A preferred embodiment of the mouse's handle of the present invention is illustrated in FIG. 2. The angled, plastic grip-rod 10 allows the user to grip the mouse with the hand in a natural writing position, as if using a pencil. The grip-rod 10 allows the hand to grip the mouse at a naturally curved position rather than placing the hand flatly on top of the mouse to maneuver it. In the preferred embodiment, the base 20–24 is a rubber material that cradles the hand according to the natural curves of the human hand. The rise 26 on the base allows for the wrist to comfortably rest on the mouse at a convenient angle. Also on the base are three grooves, which cradle the ring finger 22, middle finger 20, and the pinkie finger 24. The grooves enable the aforementioned fingers to fold under the palm of the hand without discomfort. The rubber material of which the base consists, also enables the hand to have a steady grip of the mouse without the hand slipping off the base.

Figure 3:
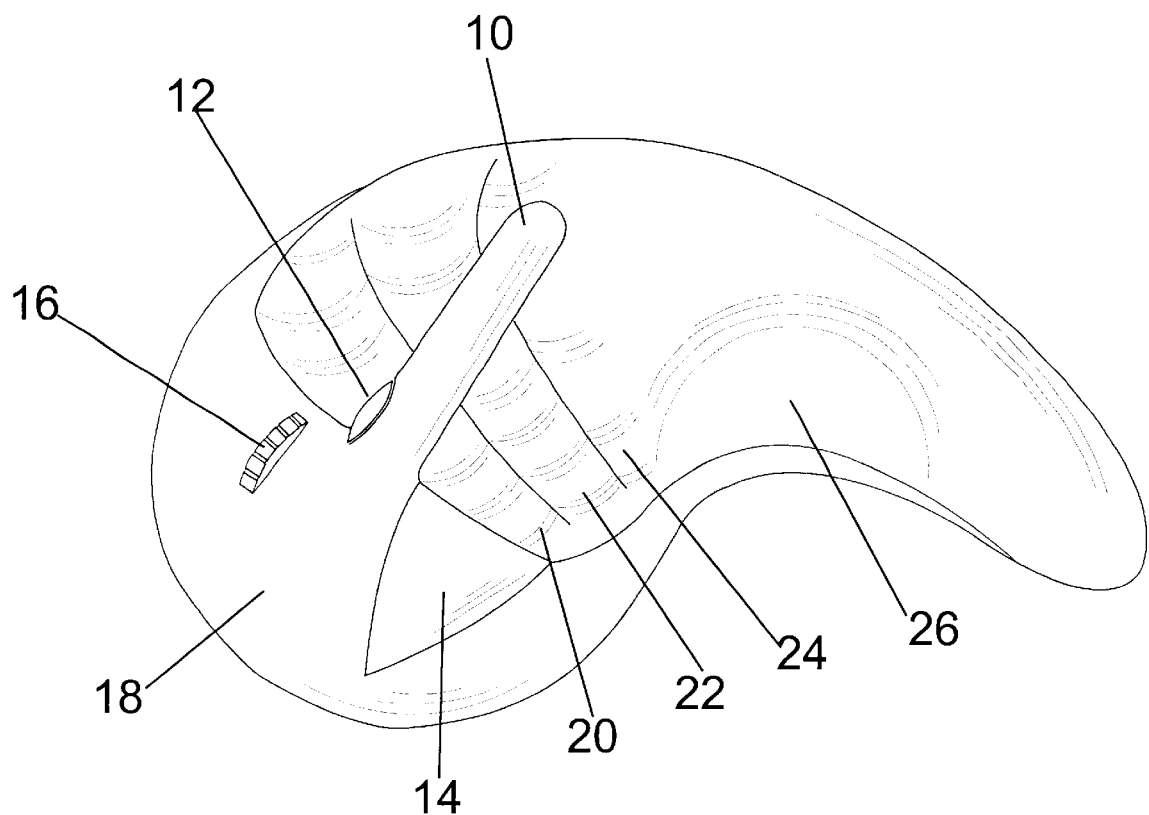
FIG. 3 is a top elevation view.
Figure 4:
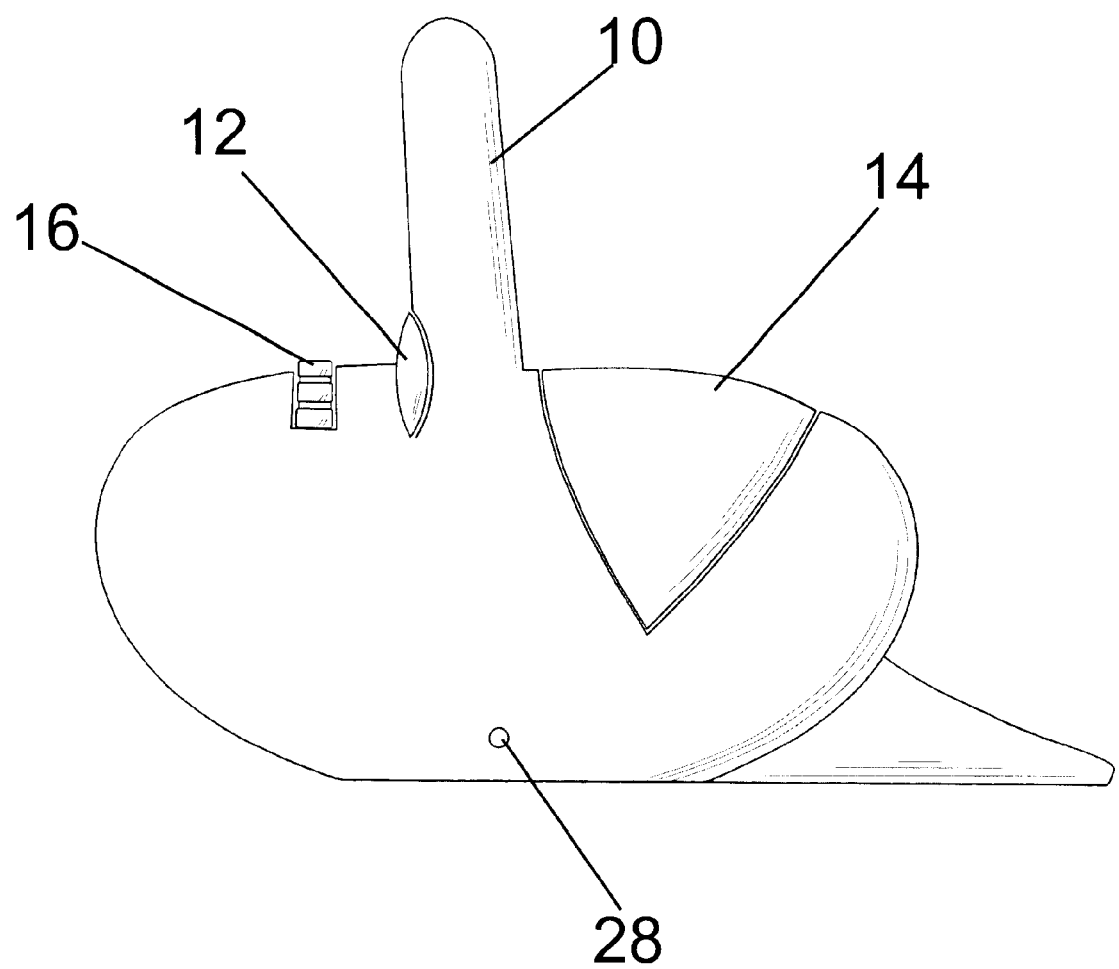
FIG. 4 is a front elevation view.
Figure 5:
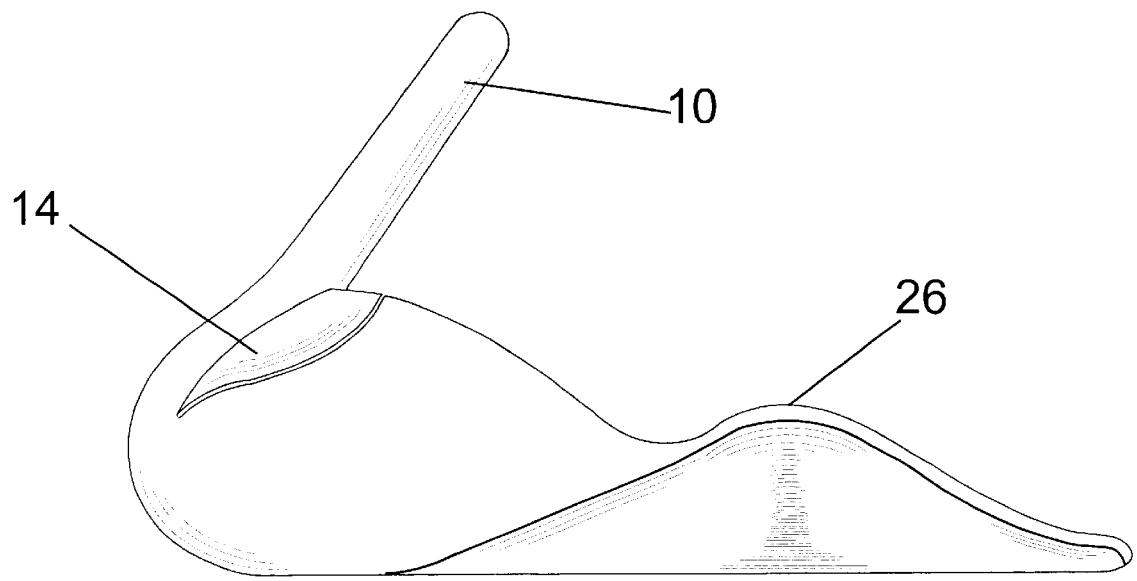
FIG. 5 is a right elevation view.
Figure 6:
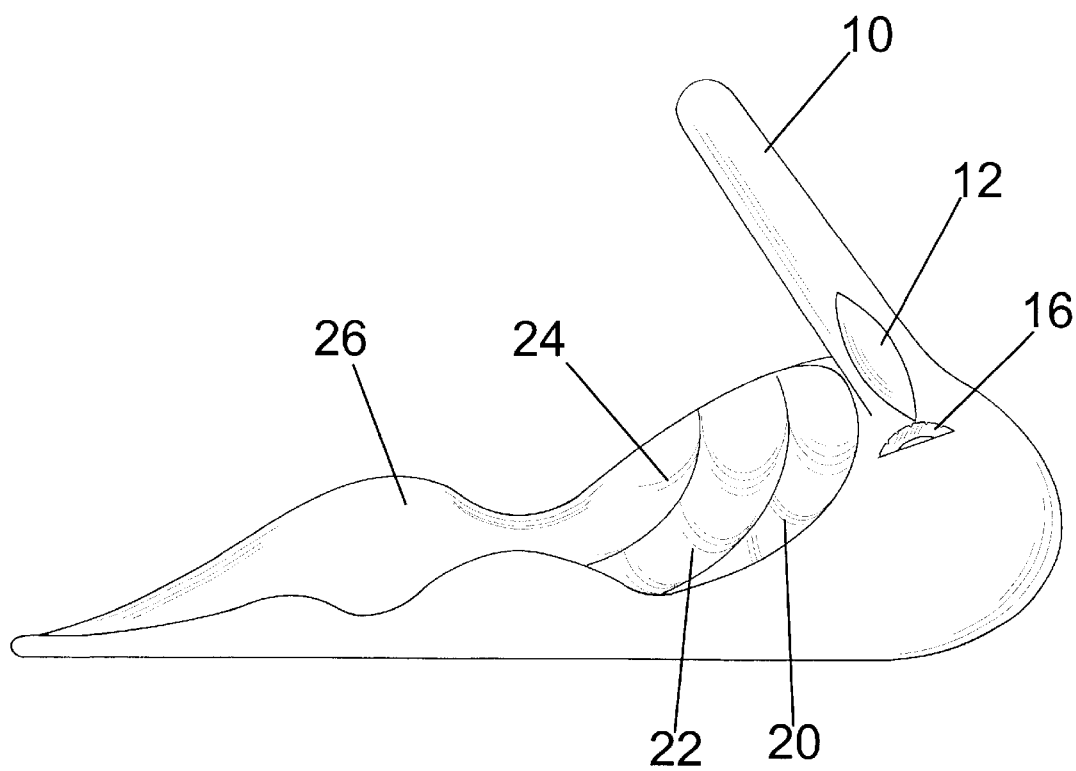
FIG. 6 is a left elevation view.
Figure 7:
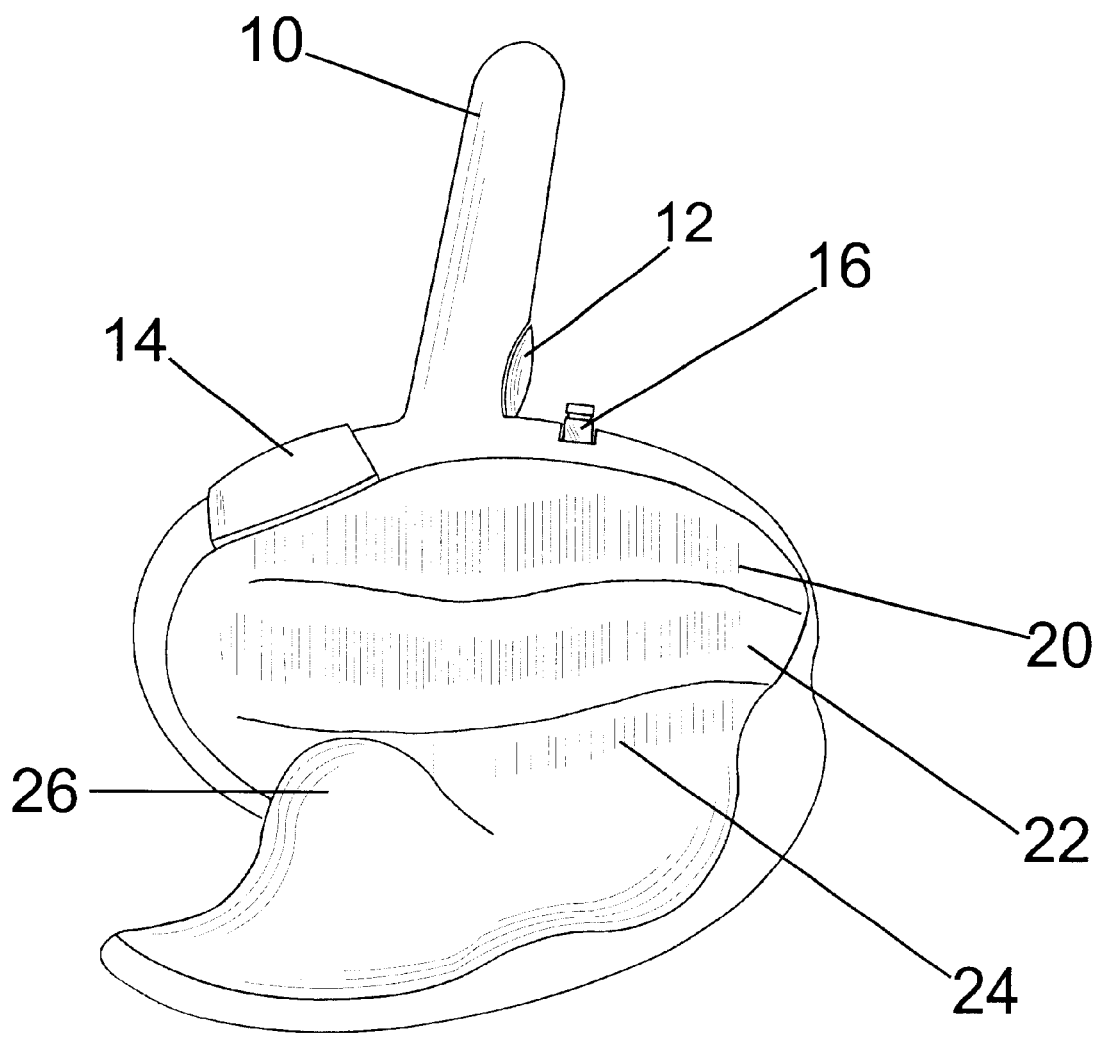
FIG. 7 is a rear elevation view.

FIGS. 2–3 Additional Embodiments

Additional embodiments are shown in FIGS. 2–3, in which the mouse's main button 12 to click is functioned with the index finger. The main click button 12 is found to the right of the grip-rod 10. The second click button 14, also shown in this figure, is functioned with the thumb. The 2$^{nd}$ click button 14 is located to the left of the grip-rod 10. The index finger is also used to control the scrolling button 16 allowing for easy access to scrolling functions. A special rise 26 in the grooved and contoured hand base is made to accommodate and support the natural curvature of the wrist when placed on the mouse. The mouse body of 10–28 is a covering to the conventional mouse, its bottom frame, and ball. Although this invention seeks to modify the body of the standard mouse, the general mechanics of the mouse, or its conventional usage, in no way would be changed. The prior art of the conventional mouse's bottom frame, ball and optical device are still used.

CONCLUSTION, RAMIFICATION, AND SCOPE

Based on the above description of the invention, this ultra ergonomic mouse will provide users with great comfort and reduced fatigue even over extended hours of computer use. The mouse is specially designed to allow the hand, wrist, and forearm to follow the natural alignment of the arm, relative to the body. Instead of the hand being placed on top of the mouse, as with conventional mice, the hand can be rested on the mouse in a naturally curved position. The grip-rod on this ergonomic mouse allows for the hand to form a pen-like grip on the mouse, much like as if one was writing. The rubber foundation of the mouse is grooved according to the natural curvatures of the hand. It also acts as a cradle for the last three fingers—middle, ring, and pinkie fingers. The layer of rubber placed on top of the mouse gives the hand a comfortable base to rest. The smooth rubber layer provides a steady surface for the hand in maneuvering the mouse. This provides a non-slip grip of the mouse, even for a child's small hands.

Although the above description contains specificities, these should not be construed as limitations to the scope of the invention, but as merely providing illustrations of some of the presently preferred embodiments of this invention. For example, the material of the base or grip-rod, the number of grooves in the foundation, etc. can all be varied and altered. Thus the scope of the invention should not be determined by the appended claims and their legal equivalents, but rather by the examples given.

I claim:

1. A hand-held operating mouse, more ergonomic in shape and feel, comprising: a grip-rod, placed between the thumb and index finger, a rubber base foundation, designed with a rise at the base for supporting the curves of the wrist, a contoured area on the base wherein the palm of the hand would be allowed to rest comfortably, grooves at the base of the grip-rod provided for the remaining fingers (aside from the thumb and index finger) which cradles the fingers in a natural, comfortable fashion, allowing the fingers at hand to rest within the grooves of the rubber contoured base; and two functioning click buttons, found on either side of the grip-rod, a scrolling button, and a hole accommodating for a power cord or space for an optical device allowing for communication with the computer.

2. The computer mouse of claim 1 wherein said grip-rod is made of some form of plastic material; said grip-rod is placed between the thumb and index finger, where the two meet, and held as maybe in the fashion of a hand holding a pencil.

3. The computer mouse of claim 1 wherein two functioning click buttons are found on either side of the grip-rod where the click button for the thumb is wide and easily accessed by the thumb, and the click button for the index finger is more sleek, following the extension of the index finger; where also can be found the functioning scrolling button, placed conveniently on the mouse in order to ensure quick access and comfort and ease to the user's hand and is employed by the index finger.

4. The computer mouse of claim 1 wherein the said mouse's hand base or foundation consists of a contoured rise, at the base of the mouse, placed to support the natural curvature of the user's wrist; the contoured rise is angled so that it is higher on one side, following the natural rise and curvature of the wrist when it is in a writing position.

5. The computer mouse of claim 1 wherein the said mouse's hand base or foundation consists also of grooves pre-placed in order to cradle the fingers folded under the palm, as when a hand is in the position of writing with a pencil; where also the foundation supports the side of the palm along with the fingers that may be folded under the palm and cradled by the indented grooves within the base.

6. The computer mouse of claim 1 wherein the mouse's hand base or foundation is made of a rubber material that is smooth and comfortable to the touch of the human hand.

* * * * *